(12) United States Patent
Miller

(10) Patent No.: US 10,869,739 B2
(45) Date of Patent: Dec. 22, 2020

(54) DENTAL IMPLANT

(71) Applicant: Greg Miller, North Adelaide (AU)

(72) Inventor: Greg Miller, North Adelaide (AU)

( * ) Notice: Subject to any disclaimer, the term of this patent is extended or adjusted under 35 U.S.C. 154(b) by 0 days.

(21) Appl. No.: 15/509,021

(22) PCT Filed: Sep. 4, 2015

(86) PCT No.: PCT/AU2015/000545
§ 371 (c)(1),
(2) Date: Mar. 6, 2017

(87) PCT Pub. No.: WO2016/033642
PCT Pub. Date: Mar. 10, 2016

(65) Prior Publication Data
US 2017/0252129 A1    Sep. 7, 2017

(30) Foreign Application Priority Data
Sep. 5, 2014    (AU) .................................. 2014903542

(51) Int. Cl.
*A61C 8/00*    (2006.01)
(52) U.S. Cl.
CPC ............ *A61C 8/0025* (2013.01); *A61C 8/005* (2013.01); *A61C 8/0037* (2013.01); *A61C 8/0089* (2013.01); *A61C 8/006* (2013.01)
(58) Field of Classification Search
CPC ..... A61C 8/0037; A61C 8/0025; A61C 8/005; A61C 8/0078; A61C 8/0028; A61C 8/0077; A61C 8/0014; A61C 8/0021; A61C 8/0024; A61C 8/0022; A61C 8/0071; A61C 8/0072; A61C 8/006; A61C 8/0069
See application file for complete search history.

(56) References Cited

U.S. PATENT DOCUMENTS

| 6,227,858 B1 * | 5/2001 | Lundgren | A61C 8/005 433/173 |
| 2007/0099151 A1 * | 5/2007 | Ilan | A61B 17/864 433/173 |
| 2007/0099153 A1 * | 5/2007 | Fromovich | A61C 8/0022 433/174 |

(Continued)

FOREIGN PATENT DOCUMENTS

| WO | 2008/157137 A1 | 12/2008 | |
| WO | WO 2008157138 A2 * | 12/2008 | ............. A61C 8/005 |

(Continued)

*Primary Examiner* — Sean M Michalski
*Assistant Examiner* — Shannel N Wright
(74) *Attorney, Agent, or Firm* — Sand, Sebolt & Wernow Co., LPA

(57) ABSTRACT

A dental implant for securing an abutment to a jawbone, the implant including a tapered body having a longitudinal axis, the body including a coronal end and an apical end, the coronal end including an inclined coronal surface. A first bore receives a base portion of the abutment, the first bore extending downwardly from the coronal surface and parallel to the longitudinal axis of the body. A second bore with a footprint larger than the first bore includes a flange adapted to be abutted by a top portion of the abutment, the diameter of the second bore being off-axis and larger than that of the first bore.

11 Claims, 3 Drawing Sheets

(56) References Cited

U.S. PATENT DOCUMENTS

| | | | |
|---|---|---|---|
| 2007/0117066 A1* | 5/2007 | Jorneus | A61C 8/0037 433/173 |
| 2007/0148622 A1* | 6/2007 | Gogarnoiu | A61C 3/03 433/173 |
| 2009/0111072 A1* | 4/2009 | Lombardo | A61C 8/005 433/174 |
| 2009/0117520 A1* | 5/2009 | Kikuchi | A61C 8/005 433/174 |
| 2009/0305191 A1* | 12/2009 | Jandali | A61C 8/0089 433/174 |
| 2010/0075277 A1* | 3/2010 | Wils | A61C 8/005 433/193 |
| 2011/0027756 A1* | 2/2011 | Benatouil | A61C 8/0018 433/174 |
| 2011/0053114 A1* | 3/2011 | Shimoda | A61C 7/36 433/173 |
| 2011/0097687 A1* | 4/2011 | Engman | A61C 8/0068 433/174 |
| 2011/0229854 A1* | 9/2011 | Fischler | A61C 8/005 433/174 |
| 2012/0219928 A1* | 8/2012 | Abboud | A61C 8/005 433/174 |
| 2012/0237899 A1* | 9/2012 | Holmstrom | A61C 8/0001 433/174 |
| 2013/0065198 A1* | 3/2013 | Abboud | A61C 8/0022 433/174 |
| 2013/0224687 A1* | 8/2013 | Karmon | A61C 8/0022 433/174 |
| 2014/0127643 A1 | 5/2014 | Heo et al. | |
| 2016/0100916 A1* | 4/2016 | Jorneus | A61B 17/8877 433/173 |
| 2016/0135930 A2* | 5/2016 | Woldegergis | A61C 8/0016 428/174 |

FOREIGN PATENT DOCUMENTS

| WO | 2009/127880 A1 | 10/2009 |
|---|---|---|
| WO | 2012-164560 A1 | 12/2012 |

* cited by examiner

DENTAL IMPLANT

FIELD OF THE INVENTION

The present invention relates to a dental implant.

BACKGROUND

Dental implants have been used for a number of years as anchors for missing teeth. They not only can replace a single tooth by supporting one dental crown, but can support a full arch of teeth either on a bridge or over-denture.

Inserting a dental implant involves a surgical procedure where the implant is embedded into the bone that allows osseointegration to occur. If the bone is hard, dense and stable then good primary stability can be achieved allowing the implant to be quickly fitted with a tooth or prosthesis.

Unfortunately, often the bone levels at the location where an implant is to be placed are at dissimilar height due to the anatomical variability within the mouth—which manifests as either a diminished buccal, (cheek side) bone eight in posterior teeth, to an extended labial, (lip side) bone height on upper teeth. Often however due to anatomical limitations caused by the impingement of vital structures, such as maxillary sinus and inferior alveolar nerve, inadequate bone is available for such rigid fixation. Limitations are also caused due to loss of human bone from trauma or resorption leading to inadequate bone below the implant.

To compensate for the above difficulties, conventional dental implants are configured for placement at an angle, and intermediate componentry is then used to correct the angulation issue. This intermediary element, (abutment) then allows the dental crown of prosthesis to be cemented or screwed into place. However, if the angulation is more than a few degrees, it may not be possible to use a screw retained crown as the position of the screw hole may be unfavourable. Consequently, in such circumstances it may be necessary to use cement retention instead of screw retention. The problem with this is that this leads to irretrievability, excess cement causing peri implant disease (bone loss), as well as adding additional placement complexity as a result in the increased number and cost of components. Despite these problems cement retention almost becomes unavoidable given that the implants have to be placed at such an acute angle.

Whilst alternative procedures have been developed to avoid this they are often costly and complex, (cross pinned restorations) or involve additional surgical procedures and time to ensure that the bone into which the implant is placed is augmented in such a way that an implant can be placed in the correct axial position to restore a missing tooth or teeth.

Bone grafting is a sometimes painful and costly procedure with a higher rate of failure for the implant and complication from the bone graft as well as requiring often a second surgical site and increased surgical skill and healing time.

Solutions to avoid this have also included implants with angulated heads to correct the bone height discrepancies, avoid anatomical structures and bony limitations. These implants historically have suffered from the flaw that the abutment screw is placed perpendicular to the angulated head. This means that these screws must be smaller, (hence more prone to fracture and loosening). The angulation of this screw channel also serves to weaken the lateral implant wall and creates unfavourable stress distribution concentrations within the dental implant.

SUMMARY OF THE INVENTION

Therefore in one form of the invention there is proposed a dental implant for securing an abutment to a jawbone, the implant including:
a tapered body having a longitudinal axis, the body including a coronal end and an apical end, the coronal end including an inclined coronal surface;
a first bore for receiving a base portion of the abutment, the first bore extending downwardly from the coronal surface and parallel to the longitudinal axis of the body;
a second bore having a footprint larger than the first bore and including a flange adapted to be abutted by a top portion of the abutment, the diameter of the second bore being off-axis and larger than that of the first bore.

In preference the implant includes a third bore shaped and configured to be engaged by a tool to rotate the implant.

In preference the implant includes threads extending substantially alongside the length of the body and includes micro threads adjacent the coronal end, the micro threads adapted to engage dense bone.

In preference the micro threads do not terminate equidistant from the top of the implant.

In preference the dental implant further includes a polished beveled section extending partially around the perimeter of the implant.

In preference the beveled portion is of a crescent semi-circular shape being highest at the most superior portion of the coronal inclined surface and absent in the most inferior portion of the coronal surface.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

Reference will now be made, by way of example only, to the accompanying drawings.

DRAWING LABELS

Figure 1:
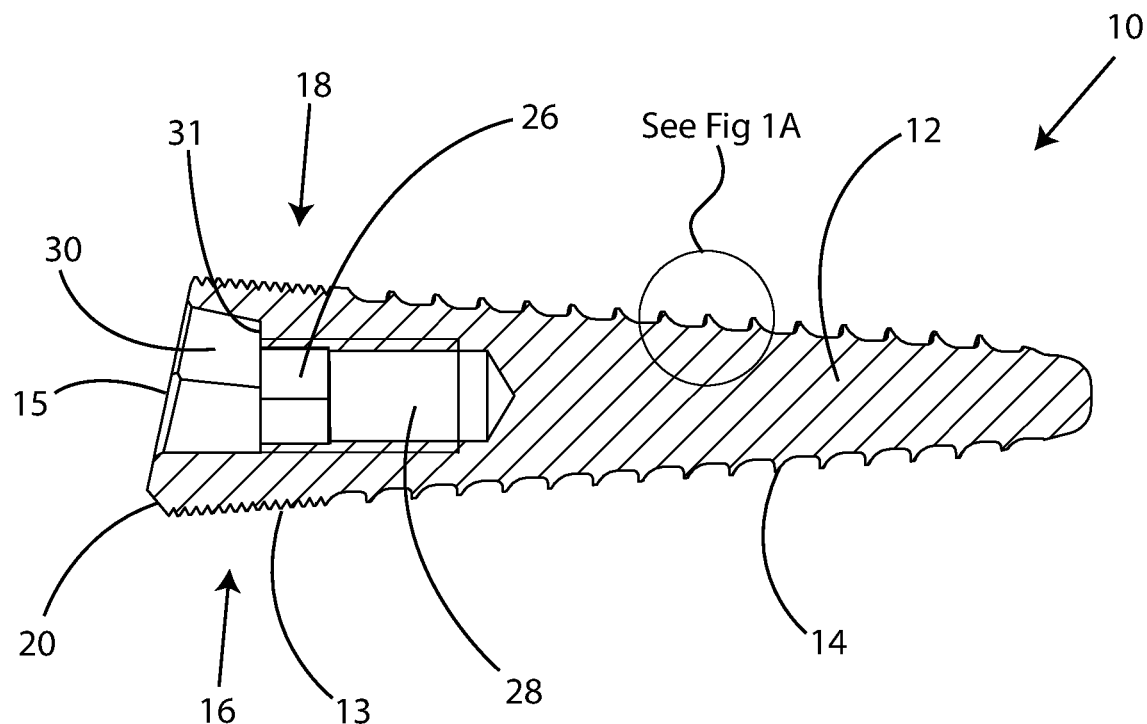
FIG. 1 is a cross-sectional view of a dental implant according to a first embodiment of the present invention.
Figure 1A:
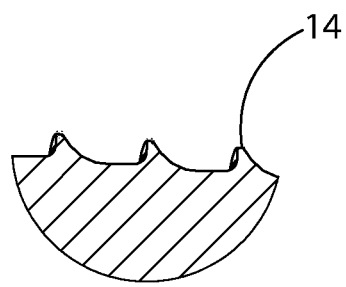
FIG. 1A is an enlargement of the highlighted region of FIG. 1.
Figure 2:
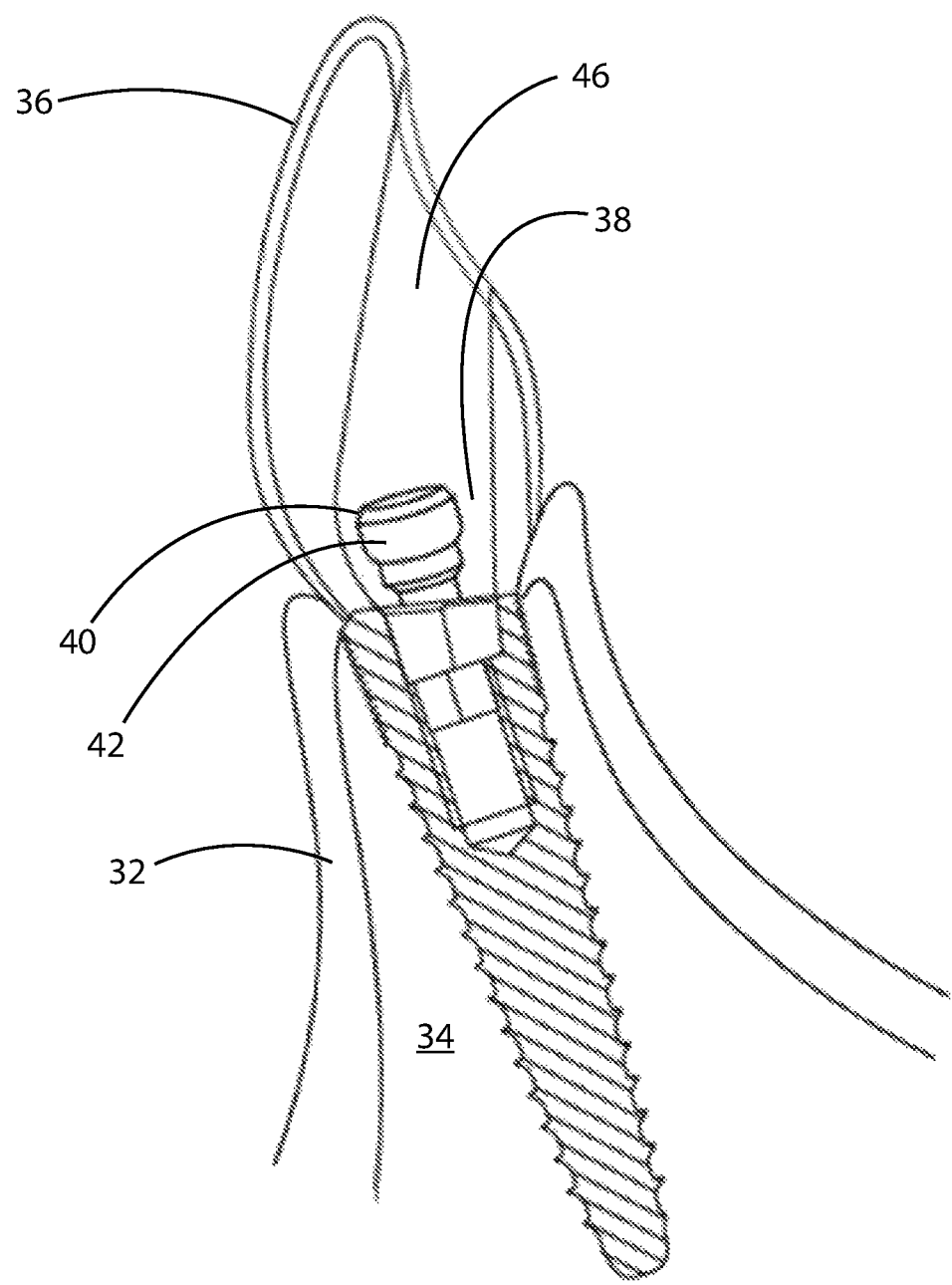
FIG. 2 is a cross-sectional view of an implant and abutment with a fixed tooth

The drawings include items labeled as follows:

10 dental implant
12 tapered body
13 micro threads
14 screw threads
15 angulated head
16 one side
18 coronal side
20 beveled edge
26 secondary bore
28 central bore
30 third bore 31 seat
32 tissue
34 bone
36 tooth
38 screw aperture
40 abutment screw
42 head of abutment
46 tooth cavity

DETAILED DESCRIPTION OF THE INVENTION

The following detailed description of a preferred embodiment of the invention refers to the accompanying drawings. Wherever possible, the same reference numbers will be used throughout the drawings and the following description to refer to the same and like parts. As used herein, any usage of terms that suggest an absolute orientation (e.g. "top", "bottom", "front", "back", "horizontal", etc.) are for illustrative convenience and refer to the orientation shown in a particular figure. However, such terms are not to be construed in a limiting sense as it is contemplated that various components may in practice be utilized in orientations that are the same as, or different than those, described or shown. Dimensions of certain parts shown in the drawings may have been modified and/or exaggerated for the purposes of clarity or illustration.

Turning now to the drawings in detail there is shown an implant 10 including a tapered body 12 with screw threads 14 extending helically about the cylindrical, tapered body 12 of the implant 10 to ensure anchorage in bone 34 covered by tissue 32. The implant body 12 is tapered along an axis extending from an upper proximal-most end to a lower apical end. The coronal of the implant body includes micro-threads 13 and at the apical end and cutting flutes (not shown) to enable greater initial surgical engagement and stability within the bone. The micro threads 13 tightly encircle the most coronal aspect of the body.

The present invention aims to allow implant restoration either along the long axis of the implant or in an angled fashion should anatomy or available bone require it. It involves the use of an angulated head 15 on the implant 10 that is raised on one side 16 with micro threads 13 almost all the way to the top, whilst in the other coronal section side 18 the micro threads 13 go the complete top of the implant 10. This is unique as the micro threads 13 do not terminate equidistant from the top of the implant on either side coronally—with one side having threads to the top of the implant and the other having a greater cutback.

The taller head 15 of the implant 10 has a beveled edge 20 that does not contain micro threads but rather is polished and appearing like a crescent and is situated upon the crest of the implant 10 tapering as it tracks downwards along the circumference. From the angulated head 15 of the implant 10 a central bore 28 runs not perpendicular to the coronal or angulated plane 15 as with most implants but rather centrally along the long axis of the implant 10 as per most implants with flat rather than angled heads.

This central bore 28 enables the fixation/abutment screw 40 to be placed into the implant 10 should the operator decide to restore the implant in a conventional screw retained manner with the screw and hence the screw channel within the restoration, (crown or prosthesis) running parallel to the long axis of the implant. Above the taps for the abutment screw 40 resides an indexation feature that inhibits movement and ensures correct seating location of the implant restorative prosthesis to the implant.

A secondary bore 26 is of a shape and configuration to enable a tool to be used to screw the dental implant 10 into the bone 34.

A third bore 30 runs angulated, not perpendicular to the angulated plane 15 of the implant's coronal portion but at a more acute angle, tapering inward. This bore is not centred and does not run immediately into the centre of the first and second bores but rather at an angle of some 10-20 degrees for reasons discussed below.

A seat 31 resides at the base of the third bore 30 closest to the shorter of the coronal sides of the implant 18. This bore 30 acts as a secondary retentive and guidance feature. It also crucially enables angulated access and placement of the fixation/abutment screw 40 in a manner that enables the screw access to the utilized in conditions that previously it could not without use of an intermediary abutment, cross pinning bone grafting, or compromising the implant wall thickness.

The combination of this central non symmetrical bore 30 cut out of a portion of the first centralized bore 28 has many advantages to retrieval, ease of use, wide application and variety of locations the implant can now be safely placed and restored. It allows a one configuration for all indication option to now be explored, as well as enhancing the anti-rotational aspects of the implant, and enables the implant to be driven into place by the driver being inserted into the second bore 26 without the need for altered or complicated tooling outside of industry standards.

The tapered polished collar 20 enables full embedding of the implant 10 on the palatal, (roof of mouth) or lingual, (tongue side) of bone which is commonly the most resilient and prominent bony landmark, whilst then enabling the higher coronal position to have the benefit of bony support coupled with. In the case where implants are placed in an immediate extraction socket, loss of bone due to natural resorption is very likely upon the labial, (lip side) or buccal, (cheek side). By utilizing this polished collar in a crescent shape, the rough surface of the implant should not be exposed to the oral environment if some bone loss was to occur. This then diminishes the likelihood of post placement complications such as bone loss.

The tapering of the polished collar 20 posteriorly means that the lower portion of the implant coronally, can be fully seated in dense bone without the concern that bone would resorb in this region due to the inferior integration to smooth surfaces.

Figure 3:
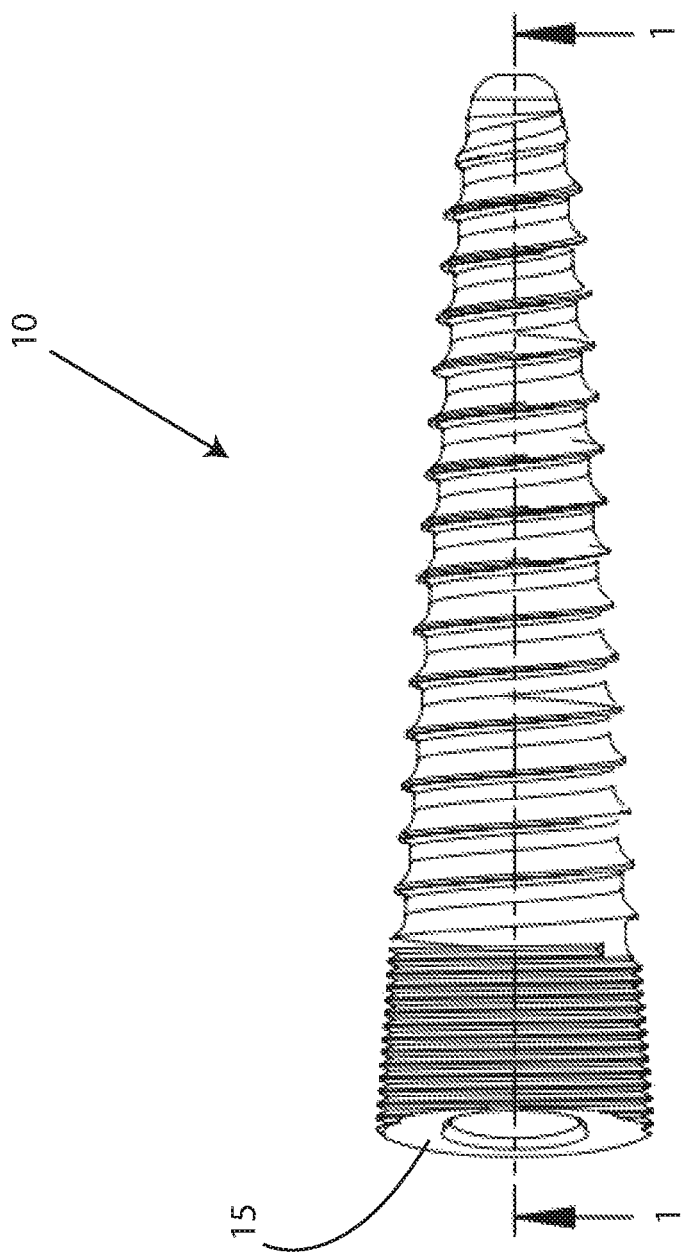
FIG. 3 is a side view of the implant as in FIG. 1.
Figure 3A:
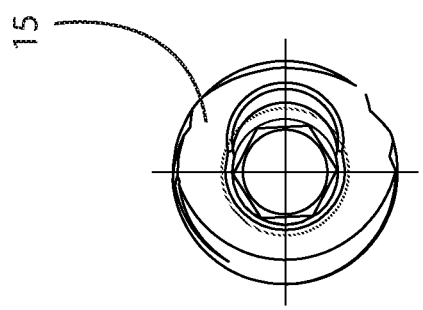
FIG. 3A is a left end elevation view of the implant shown in FIG. 3.

Once the implant is placed with sufficient primary stability or it has osseointegrated, it is possible for the abutment 40 to be screwed into it. The abutment includes a head 42 to which is attached a tooth 36 having a screw aperture 38. The tooth is attached using well known cement techniques. Thus shown in FIG. 3 is the abutment screw with the tooth prior to it being secured to the implant 10. Once it is secured, the head 42 of the abutment 40 is fully contained within bore 30.

Once the tooth has been attached to the implant the cavity 46 in the tooth is closed with dental filling material and due to the angle of the tooth, it cannot be seen generally outside of the mouth. Thus when the tooth needs to be replaced, the filling material can be removed and the bore 30 is of such a shape and configuration to enable a tool to be inserted through the aperture 30 and cavity 46 to engage the abutment screw and remove it, including the tooth from the implant.

The reader will now appreciate the present invention. It relates to a one or two stage bone level dental implant beveled at the level of fixture interface for surgical implantation within alveolar bone. It comprises a cylindrical longitudinal body with a coronal head that is angled relative to the long axis of the implant. This flat coronal portion has a curvilinear recess mated to a central shaft containing an indexation hex and also screw receptacle, both oriented upon the long axis and centred within, the implant.

The design is such that the implant can function in conventional or angled applications within the anterior and posterior of the maxilla and mandible. The dental implant system includes a longitudinally elongated implant body and an abutment which is adapted for coupling thereto in a laterally offset position. The curvilinear recess extends inwardly from the seating surface along a bore axis inclined at an angle relative to the longitudinal axis of the implant body. Within the central access bore adjacent the curvilinear recess—a indexation hex prevent abutment and restoration rotation relative to the implant body.

The implant system includes an implantable implant body and an axially elongated fixture mount which is detachably coupled thereto. The prosthetic screw includes a recess or bore of a shape configured to receive a rotational tool of different shapes, such as a hexagon or multigrip conventional Allen® wrench to install or remove the coupling screw from the implant To join a prosthesis to the dental implant a prosthetic screw is required and the indexation portion of the prosthesis aligned and inserted into the recess provided. Furthermore, a conical portion can be inserted into the off axis bore upon the coronal of the restoration to further index and ease orientation of the restoration Upon the section of the implant that does not include the micro threads, grooves are located on the body. This does not deteriorate the strength of the implant. The locations of the grooves can vary according to configuration and desired aggressiveness and profile of thread.

The threaded portion of the dental implant can comprise two flutes positioned at the apical portion of the dental implant. The flutes can be configured to aid in inserting the dental implant. The flutes can extend from the apical end toward a generally central portion of the dental implant. The flutes can be located at generally opposing positions along the threaded portion of the implant body. The flutes are configured to cut, or remove bone, when the dental implant is rotated. Furthermore, the flutes are configured to allow the dental implant to be rotated in the opposite direction without cutting or removing bone.

The dental implant has been described with flutes that are configured to cut when the dental implant is rotated, other suitable flutes or flute orientations may also be used. Such suitable flutes or flute orientations may comprise flutes that are configured to cut or provide a tapping function when the dental implant is rotated in either a clockwise or anticlockwise direction.

The present invention is not concerned with the implant modality that is used. The invention is, however, concerned with the suitability of the implant for surgical placement, the ability to place the implant non-axially to the restoration, in the relationship of the connection between implants and attachments, as well as with other matters.

The abutment comprises a post and a stem extending from the post. The stem is adapted to fit in the interior bore. An abutment screw is adapted to fit within a through-bore extending through the post and stem of the abutment and retain to the abutment in the implant. The abutment screw comprises a proximal end (e.g., the screw head) adapted to interface with the abutment and a distal end adapted to engage the threaded section of the implant. More generally, the implant may be provided with an internal axial retention section adapted to engage an abutment retention shaft. The axial retention shaft engages an internal axial retention feature of the implant to limit axial movement of the abutment relative to the implant.

Although the invention is directed toward individual components, such as the implant, the abutment, the axial retention shaft, and to systems comprising combinations thereof, other aspects and advantages of the present invention will be apparent to one of ordinary skill in the art from a review of the Applicants' teachings.

In most conventional implant systems, an implant comprises anti rotation indexation tool. The driving tool to place the implant surgically applies relatively significant amounts of torque to the screw the implant into the patient's bone. After the implant is screwed into place and healing has occurred, an abutment is mated with the anti-rotation and indexation device and seated on the implant. On occasion due to the significant amount of torque applied to the anti-rotation indexation portion, it can distort. This distortion can, in some applications, result in play, or wiggle-room, between the implant and the abutment—leading to premature screw loosening and complications.

The system may comprise a straight or offset screw access—whilst maintaining adequate implant wall thickness and prosthetic screw length to avoid fracture of both. By maintaining the screw retention hole in the centre of the implant the implant body has greater distortion resistance when placed surgically in dense bone and hence is less prone to operative fracture or failure by fracture over many years of load.

Another unique design feature is the interrelationship between the curvilinear groove and indexing hex feature enabling the implant to have both conventional internal anti-rotation features as well as one single standard path of insertion indexed within the curvilinear recess if required. This relationship extends also to the increased access to the prosthetic screw the groove provides—enabling restoration at broader range of locations. This in turn will enable the surgeon to correct the position of the implant relative to anatomical landmarks and available bone whilst simultaneously ensuring that the screw access hole is located within the optimal location for the restoration, (usually along the long axis of the restoration).

The reader will now further appreciate the advantages of the present invention. The invention reduces the need for cement retention of prosthetic crowns as it increases access to the prosthetic screw attaching the dental crown or prosthesis to the implant. By reducing the reliance on cement retention the resultant prosthesis is more readily retrievable and has less risk of peri implant disease due to cement retention. Applying principles of this invention to dental implants reducing the amount of prosthetic and surgical equipment required as the implant can be restored in a conventional as well as off axis orientation. This increases surgical and restorative convenience—as one system is able to treat all presentations. Costs thus are reduced by eliminating or reducing the need to stock large amounts of inventory items and utilize intermediary abutments to correct for angulation. Costs are also reduced for the patient and surgeon in not needing to place bone grafting material as the implant can be placed angled into native bone without the need to simultaneously augment the bone or undertake this prior to implant surgery.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:

1. A dental implant for securing an abutment to a jawbone, the dental implant comprising:
   a body having a longitudinal axis, the body including a coronal end and an apical end, wherein the body is tapered from the coronal end to the apical end, and wherein the coronal end includes a coronal surface inclined at an angle relative to the longitudinal axis;
   a first bore adapted to receive a base portion of the abutment, the first bore extending downwardly from the coronal surface centrally along the longitudinal axis of the body;
   a second bore extending downwardly from the coronal surface centrally along the longitudinal axis of the body, wherein the second bore is of a shape and configuration to enable a tool to be received therein to screw the dental implant into bone; wherein each of the first bore and the second bore is symmetrical relative to the longitudinal axis; and
   a third bore extending downwardly from the coronal surface along a second axis, wherein the second axis is oriented at an angle relative the longitudinal axis of the body, wherein the third bore is non-symmetrical relative to the second axis; and wherein the third bore tapers in diameter moving inwardly from the coronal surface towards the second bore.

2. The dental implant as in claim 1 wherein the dental implant includes threads extending substantially alongside a length of the body and includes micro threads adjacent the coronal end, wherein the micro threads are adapted to engage dense bone; and wherein the coronal end comprises a periphery with a minimum periphery portion including a minimum point at a minimum distance from the apical end and a maximum periphery portion including a maximum point at a maximum distance from the apical end, and wherein the micro threads terminate in the minimum periphery portion and wherein the micro threads do not terminate in the maximum periphery portion.

3. The dental implant as in claim 2, further comprising a beveled portion extending between the micro threads and the maximum periphery portion.

4. The dental implant as in claim 1, wherein the body is tapered from the coronal end to the apical end at a substantially constant angle.

5. The dental implant as in claim 1, further comprising a seat at a base of the third bore, wherein the seat is located closest to a shorter side of a coronal side of the implant.

6. The dental implant as in claim 1, wherein the third bore is not symmetrical about the longitudinal axis.

7. The dental implant as in claim 1, wherein a first bore wall defines the first bore, a second bore wall defines the second bore, and a third bore wall defines the third bore; and wherein a first portion of the third bore wall is parallel to the first bore wall and to the second bore wall and a second portion of the third bore wall is inclined relative to the first bore wall and the second bore wall.

8. The dental implant as in claim 1, wherein the first bore and the second bore extend longitudinally along the longitudinal axis of the body and the third bore extends longitudinally along the second axis that is laterally offset relative to the longitudinal axis of the body.

9. The dental implant as in claim 1, wherein a first bore wall defines the first bore, a second bore wall defines the second bore, and a third bore wall defines the third bore; and wherein a first portion of the third bore wall is parallel to the first bore wall and to the second bore wall and a second portion of the third bore wall is inclined relative to the first bore wall and the second bore wall, and wherein the first portion of the third bore wall is parallel to the first longitudinal axis and the second portion of the third bore wall is inclined relative to the longitudinal axis.

10. The dental implant as in claim 1, wherein a portion of the third bore extends laterally outwardly beyond both of the first bore and the second bore.

11. The dental implant as in claim 1, wherein the coronal end is substantially flat.

* * * * *